United States Patent
Toth et al.

(10) Patent No.: US 10,368,220 B2
(45) Date of Patent: Jul. 30, 2019

(54) METHOD AND ARRANGEMENTS FOR MTC COMMUNICATION

(75) Inventors: Stefan Karl Toth, Gothenburg (SE); Gunnar Rydnell, Vastra Frolunda (SE); Hans Bertil Rönneke, Kungsbacka (SE); Hans-Åke Lund, Bohus (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1142 days.

(21) Appl. No.: 13/355,942

(22) Filed: Jan. 23, 2012

(65) Prior Publication Data
US 2012/0202508 A1    Aug. 9, 2012

(30) Foreign Application Priority Data
Feb. 4, 2011    (WO) ................ PCT/EP2011/000513

(51) Int. Cl.
*H04W 4/70*    (2018.01)
*H04W 4/00*    (2018.01)
*H04L 29/08*    (2006.01)

(52) U.S. Cl.
CPC ............ *H04W 4/70* (2018.02); *H04L 67/12* (2013.01); *H04W 4/00* (2013.01)

(58) Field of Classification Search
CPC ....... H04W 4/005; H04W 4/006; H04W 8/18; H04W 8/183; H04W 76/00; H04W 76/02;
(Continued)

(56) References Cited

U.S. PATENT DOCUMENTS

| 2011/0128911 A1 | 6/2011 | Shaheen |
| 2011/0201343 A1 | 8/2011 | Pinheiro et al. |

(Continued)

FOREIGN PATENT DOCUMENTS

WO    2009122219 A1    10/2009

OTHER PUBLICATIONS

"3rd Generation Partnership Project; Technical Specification Group Services and System Aspects; Service Requirements for Machine-Type Communicatons (MTC); Stage 1 (Release 11)", 3GPP Standard; 3GPP TS 22.368, 3rd Generation Partnership project (3GPP) Mobile Competence Centre; 650, Route Des Lucioles; F-06921 Sophia-Antipolis Cedex, France, No. V11.0.0, Dec. 23, 2010, pp. 1-23, XP050462378.

(Continued)

*Primary Examiner* — Marcus Hammonds
(74) *Attorney, Agent, or Firm* — Rothwell, Figg, Ernst & Manbeck, p.c.

(57) ABSTRACT

A server for controlling user MTC devices. The server ascertains if a user MTC device has an IP connection to a cellular access network, and if so, sends a message to trigger the user MTC device to initiate an application defined in the message. If a user MTC device does not have an IP connection, the server ascertains if the user MTC device is a mobile or a stationary user MTC device, and for a stationary user MTC device, the server sends a message to the cellular access network to trigger the user MTC device to initiate an IP connection, and for a mobile user MTC device, waits until the user MTC device has an IP connection, and for both kinds of user MTC devices, when the user MTC device has an IP connection, transmits a message to the user MTC device to initiate an application defined in the message.

18 Claims, 4 Drawing Sheets

(58) Field of Classification Search
CPC ..... H04W 28/0215; H04W 4/70; H04W 4/00; H04L 67/12
USPC .............. 455/414.1–414.4, 418, 466, 550.1; 370/328, 329
See application file for complete search history.

(56) References Cited

U.S. PATENT DOCUMENTS

| | | | |
|---|---|---|---|
| 2012/0039313 A1* | 2/2012 | Jain ...................... | H04B 17/318 370/338 |
| 2012/0057476 A1 | 3/2012 | Chan et al. | |
| 2012/0094627 A1 | 4/2012 | Suh et al. | |
| 2012/0164954 A1* | 6/2012 | Karampatsis ......... | H04W 4/005 455/67.11 |
| 2012/0179790 A1 | 7/2012 | Kim et al. | |
| 2012/0329485 A1 | 12/2012 | Lee et al. | |
| 2013/0100895 A1* | 4/2013 | Aghili ..................... | H04W 4/00 370/329 |
| 2013/0188503 A1* | 7/2013 | Anepu .................. | H04W 24/10 370/252 |
| 2013/0260801 A1 | 10/2013 | Kim et al. | |

OTHER PUBLICATIONS

"3rd Generation Partnership Project; Technical Specification Group Services and System Aspects; System Improvements for Machine-Type Communications; (Release 10)" 3GPP Standard; 3GPP TR 23.888, 3rd Generation Partnership Project (3GPP) Mobile Competence Centre; 650, Route Des Lucioles; F06921 Sophia-Antipolis Cedex, France, No. V1.0.0, Sep. 22, 2010, pp. 1-80, XP050442131.
Huawei, "MT Communication with MTC Devices Inside Private IP Address Space", 3GPP Draft; S2-102272, 3rd Generation Partnership Project (3GPP), Mobile Competence Centre; 650, Route Des Lucioles; F-06921 Sophia-Antipolis Cedex, France, vol. SA WG2, Kyoto, May 4, 2010, 3 pages, XP050434470.
Ipwireless, "UE Category and Capability Evolution in Future LTE Releases", 3GPP Draft; R1106324 Future UE Category Evolution, 3rd Generation Partnership Project (3GPP), Mobile Competence Centre; 650, Route Des Lucioles; F-06921 Sophia-Antipolis Cedex, France, vol. RAN WG1, Jacksonville, FL, USA, Nov. 9, 2010, 2 pages, XP050489719.
International Search Report issued in International application PCT/EP2011/000513 dated Oct. 27, 2011, 4 pages.
Non-final Office Action issued in U.S. Appl. No. 14/515,945 dated Jan. 29, 2015, 5 pages.
Response to Non-final Office Action in U.S. Appl. No. 14/515,945 dated Jan. 29, 2015, filed Apr. 28, 2015, 8 pages.
Final Rejection in U.S. Appl. No. 14/515,945 dated Jul. 2, 2015, 10 pages.
Reply to Final Rejection in U.S. Appl. No. 14/515,945 dated Jul. 2, 2015, filed Sep. 1, 2015, 13 pages.
Non-final Office Action issued in U.S. Appl. No. 14/515,945 dated Oct. 28, 2015, 12 pages.
Response to Non-final Office Action in U.S. Appl. No. 14/515,945 dated Oct. 28, 2015, filed Jan. 28, 2016, 11 pages.
Final Rejection in U.S. Appl. No. 14/515,945 dated Jul. 18, 2016, 14 pages.
Final Office Action issued in U.S. Appl. No. 14/515,945, dated Jul. 18, 2016, 14 pages.
Final Office Action issued in U.S. Appl. No. 14/515,945 dated Jun. 2, 2017, 14 pages.
Non-Final Office Action issued in U.S. Appl. No. 14/515,945 dated Nov. 3, 2016, 14 pages.
Response to Non-Final Office Action in U.S. Appl. No. 14/515,945 dated Nov. 3, 2016, filed Feb. 3, 2017, 10 pages.

* cited by examiner

METHOD AND ARRANGEMENTS FOR MTC COMMUNICATION

This application claims priority to International Patent Application No. PCT/EP2011/000513, filed on Feb. 4, 2011, the entire contents of which is incorporated by reference herein.

TECHNICAL FIELD

The present invention discloses a method and arrangements for use in Machine Type Communication, MTC.

BACKGROUND

Machine Type Communication, MTC, will in all likelihood play an increasingly prominent role in cellular access networks, as well as in IT systems in general. Examples of systems in which user MTC devices for MTC operations may be applied include such applications as remotely controlled power meters as well as metering MTC devices in general, and also includes remotely controlled MTC devices for controlling functions in a home which make it possible to, for example, turn on the heat when arriving home after a vacation, or to receive alerts, such as e.g. fire alarms, burglar alarms etc while on vacation. In addition to these examples, which are examples of stationary MTC applications, there are also mobile MTC applications, such as remotely monitoring and/or controlling the functions in a car or some other kind of vehicle or vessel.

MTC application in which two MTC user MTC devices talk to each other, such as the example with an MTC power meter which reports to a central server equipped with MTC communication, are sometimes referred to as M2M communication, Machine to Machine communication.

Due to the vast amount of possible applications for MTC user MTC devices and systems, a surge in signaling and in data traffic in cellular access systems can be expected.

As defined in 3GPP Rel-10, an M2M application typically consists of a plurality of MTC user MTC devices which are controlled by an MTC server. The MTC Server is a new Rel-10 functional entity which will either be part of an operator's network or will belong to an M2M service provider who is external to the operator or his network.

The MTC Server will provide functions which facilitate efficient performance as well as functionality which is tailor-made for MTC user MTC devices and applications. An MTC Server can also be seen as an abstraction of the infrastructure which an M2M service provider has. This infrastructure may include routers, servers which perform signalling and which keep subscriber data for customers of the service provider, store-and-forward servers, DNS servers, security gateways etc.

It is anticipated that many or most MTC user MTC devices will be connected through cellular access networks such as GSM, GPRS and EPS/LTE. Typically, an MTC user MTC device will have low mobility, low data consumption and infrequent communication.

In addition, many, if not most, types of MTC applications will be delay tolerant, i.e. they will not be real time applications, as opposed to traditional applications of cellular access networks, such as speech, streaming of data etc. In many cases, the application in which an MTC user MTC device is used needs the MTC user MTC device to report data, or it may happen that the application needs to transmit data to the MTC user MTC device. In most such cases, the MTC application will be tolerant to delays.

SUMMARY

It is an object of the present invention to obtain an improved server for use as an MTC server.

This object is met by the present invention in that it discloses a server for use in or in connection with a cellular access network. The server is arranged to control a plurality of user MTC devices in or in connection to the cellular access network and the server is also arranged to ascertain if a user MTC device in this plurality has an IP connection to the cellular access network.

If that is the case, i.e. if the user MTC device has an IP connection to the cellular access network, the server is arranged to send a message to the user MTC device to trigger the user MTC device to initiate an application which is defined by the server in the message. In addition, the server is arranged to, if a user MTC device in the plurality of user MTC devices does not have an IP connection to the cellular access network, ascertain if the user MTC device is defined by the server as being a mobile user MTC device or a stationary user MTC device. For a stationary user MTC device, the server is arranged to send a message to the cellular access network to trigger the user MTC device to initiate an IP connection to the cellular access network, and for a mobile user MTC device, the server is arranged to wait until the user MTC device has acquired an IP connection to the cellular access network. For both stationary and mobile user MTC devices, the server is arranged to, when the user MTC device has acquired an IP connection to the cellular access network, transmit a message to the user MTC device to initiate an application defined by the server in the message.

Suitably, the message to the cellular access network to trigger the user MTC device to initiate an IP connection to the cellular access network is sent on a signaling channel or on a special broadcast channel dedicated for that purpose.

Thus, the server of the invention can communicate directly with a user MTC device, for example an MTC user MTC device, under its control which has an IP connection to the cellular access network. In addition to this, the server of the invention is also able to communicate with user MTC devices such as MTC user MTC devices which have entered a "dormant" state in which the user MTC device does not have an IP connection to the cellular access network, by means of triggering them to acquire an IP connection, following which the user MTC device can be controlled to initiate an application such as, for example, to report data, and in the case of a dormant MTC device which is classified as being mobile, the server waits to transmit the message to initiate instructions to the user MTC device until the user MTC device has acquired an IP connection of its own volition.

In embodiments, the server is arranged to, for a mobile user MTC device which does not have an IP connection to the cellular access network, create the message to initiate an application defined by the server in the message and store it until the mobile user MTC device has acquired an IP connection to the cellular access network. Thus, the message is created but buffered until there is an IP connection for the user MTC device.

In embodiments, the server is arranged to ascertain if a user MTC device has an IP connection to the cellular access network by means of information from a RADIUS server in the cellular access network, to which the RADIUS server the server is arranged to have an interface.

In embodiments, the server is arranged to ascertain if the user MTC device is defined by the server as being a mobile user MTC device or a stationary user MTC device by means of maintaining a list of the user MTC devices in said plurality, where each user MTC device is classified as one which is either mobile or stationary.

In embodiments, the server is arranged to receive a confirmation message in reply to the message to the cellular access network to trigger the user MTC device to initiate an IP connection to the cellular access network.

In embodiments, the server is arranged to address the user MTC device in the messages which are sent to the user MTC device or to the cellular access network by means of an identifier which is internal to the server and the plurality of user MTC devices.

In embodiments, the server is arranged to include in said plurality of user MTC devices Machine Type Communication MTC devices.

In addition to the server described herein, the invention also discloses a user MTC device for a cellular access network. The user MTC device is arranged to assume a first state in which it is connected to the cellular access network and has an IP address in the cellular access network, and to assume a second state, in which second state the user MTC device is attached to the network. The user MTC device is further arranged to, when it is in the second state, either at defined points in time listen to a dedicated broadcast channel for MTC devices in the second state, on which dedicated broadcast channel the user MTC device is arranged to receive commands to assume the first state, or to, at defined points in time, assume the first state and transmit one of a number of predefined messages. Thus, the second state can be seen as a "dormant" states, from which the user MTC device can be awakened, i.e. shifted to the first state by means of messages on a special broadcast channel which is used for the purpose of "awakening" dormant MTC devices.

BRIEF DESCRIPTION OF THE DRAWINGS

The invention will be described in more detail in the following, with reference to the appended drawings, in which.

DETAILED DESCRIPTION

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

Figure 1:
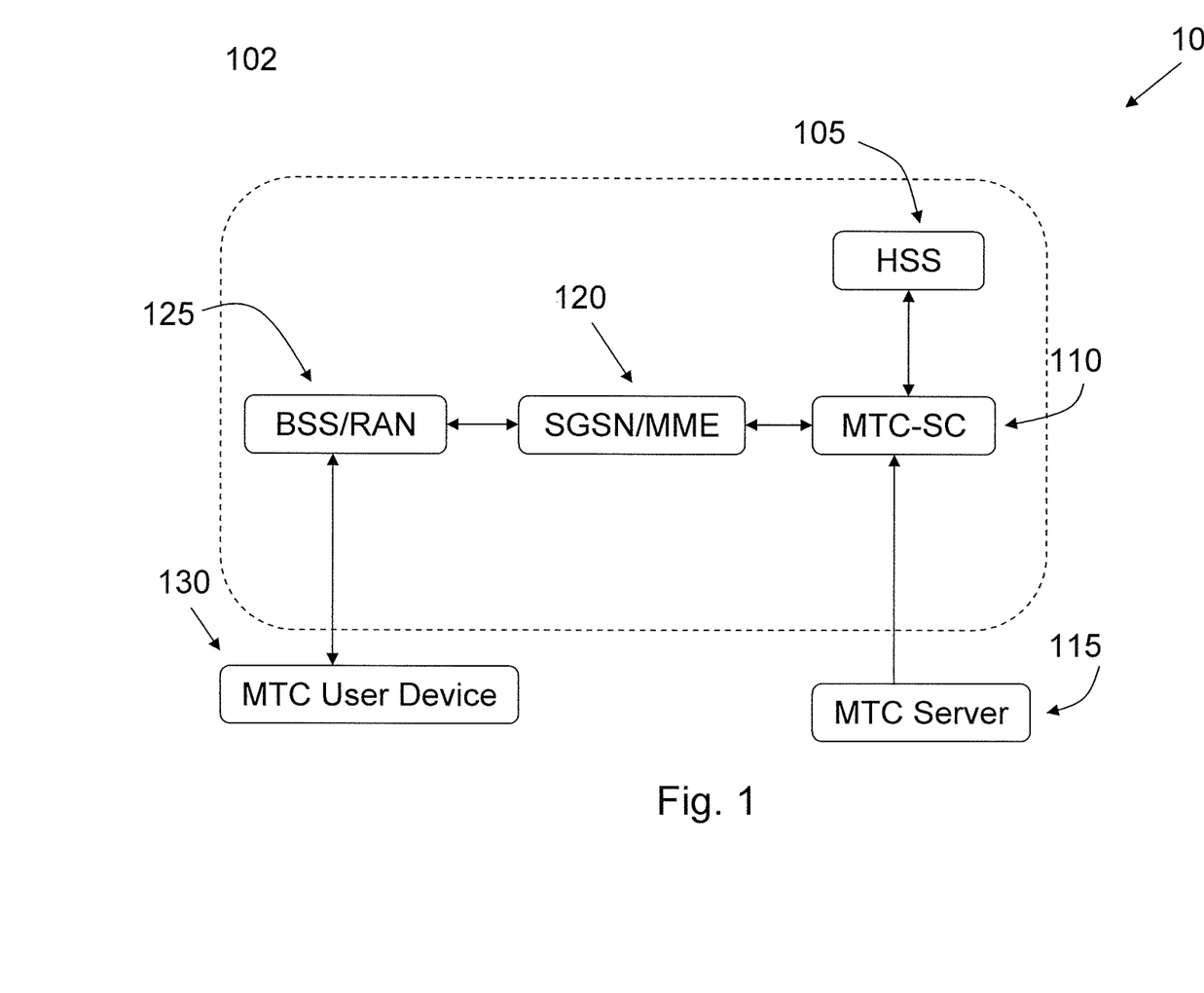
FIG. 1 shows a schematic view of a system in which the invention is applied.

FIG. 1 shows a schematic overview of a cellular access network 100 in which the invention is used. A server 115 of the invention, shown as an MTC server, is connected to the cellular access network 100, which will from now on also be referred to merely as "the network". The MTC server 115 can be connected to the network but "be outside" of it, as shown in FIG. 1, or, alternatively, it can be an integral part of the network 100. In the embodiment shown in FIG. 1, the MTC server 155 is connected to an entity labeled MTC-SC, MTC Service Center, shown as 110 in FIG. 1.

The MTC-SC 110 is connected to a Home Subscriber Server, abbreviated as HSS, and shown as 105 in FIG. 1, and is also connected to an SGSN or an MME 120 in the network 100. The network 100 can be a 2G or 3G system in which case an SGSN is used, or it can be a 4G network in which case an MME is used. The SGSN/MME 120 is in turn connected to a Base Station System 125 or to a RAN, Radio Access Network, which interfaces to an MTC user MTC device 130. Only one MTC user MTC device 130 is shown in FIG. 1, but it should be pointed out that this is merely in order to facilitate the description and ease the understanding of FIG. 1—the network 100 can of course accommodate a much larger number of MTC user MTC devices.

The invention encompasses both an MTC server such as the one 115 and an MTC user MTC device such as the one 130.

MTC user MTC devices that are stationary, i.e. never move geographically, can reduce their energy consumption by entering a dormant state, including deregistering from the network, in which dormant state they do not have an IP connection to the network 100. If an MTC user MTC device is designed to only use Mobile Originated communication, it may only wake up when it needs to communicate with the MTC server, whereas if an MTC user MTC device is only or also designed for Mobile Terminated communication, it needs to wake up at intervals to read a paging or broadcast channel in order to be able to respond to communications requests triggered from the MTC server.

It is assumed that stationary MTC user MTC devices can do this (read a paging or broadcast channel) without registering to the network, i.e. without acquiring an IP address. Entering a dormant state will save energy in the MTC user MTC device, and will also reduce the signaling load in the network 100 if the communication is sufficiently infrequent.

The MTC server 115 of the invention has the ability to trigger MTC user MTC devices to go from a dormant state to a state with an established IP connection to the network 100 so that the MTC user MTC devices can communicate with the MTC server 115.

In one aspect of the invention, it is assumed that an MTC user MTC device and the MTC server 115 can utilize a new identity/addressing/numbering scheme which can uniquely identify 50 billion ($50*10^9$) or more MTC devices MTC user MTC devices. These MTC user MTC device identities/addresses/numbers are used in the signaling between the MTC server and the cellular access network 100; if an MTC SC 110 is used, the new scheme is used in the signaling between the MTC server 115 and the MTC SC 110.

As mentioned previously, an MTC user MTC device can either be stationary or mobile. A stationary MTC user MTC device needs not necessarily be registered (attached) in the network. A mobile MTC user MTC device, however, needs to be registered in the network and report location changes in order to be found for paging or MTC device triggering messages.

When the MTC server wants to contact an MTC user MTC device that has no connection established or that the MTC server knows is dormant or in some other "low activity state" in order to save battery energy and signaling resources, the MTC server sends a "MTC device triggering message" to the network 100, e.g. to the MTC-SC 110. The MTC-SC 110 in turn contacts the HSS 105 using, in one embodiment, a special MTC user MTC device identity as a key to get information about the MTC user MTC device's mobile identity, i.e. its IMSI, its current location, i.e. SGSN/MME address, and whether the MTC device is stationary or not. When the MTC-SC has received the response from the HSS, it forwards the MTC device triggering message together with the IMSI and stationary/mobile type information to the SGSN or MME where the MTC user MTC device is located. "Located" may either be where the MTC user MTC device is registered or where it was last registered.

The SGSN or MME that receives the "MTC device triggering message" decides how to trigger ("wake up") the MTC user MTC device based on the stationary type information (and thus in what "low activity state" it is) and if the MTC device is currently registered or not.

If it is a non-stationary MTC user MTC device that is already registered (attached) to the network, the SGSN or MME initiates a paging procedure and when the MTC user MTC device has answered the page, the MTC device triggering message is sent out to the MTC device in the control/signaling plane. If the MTC user MTC device does not have IP connectivity, it initiates a procedure to set up a PDN connection to get IP connectivity If it is a stationary MTC user MTC device that is not registered to the network, the SGSN or MME initiates a new type broadcast search for polling the MTC device. These types of MTC device are in an unattached "low activity state" and only listens to a new specific broadcast channel. If its IMSI is broadcast on this channel it knows that is shall immediately register to the network by initiating the attach procedure as well as the procedure to get IP connectivity (a PDN connection). Alternatively the P-TMSI/S-TMSI that was previously assigned to the MTC user MTC device may be used in the broadcast given that the network has kept it reserved for the MTC device. Another alternative is that the new MTC user MTC device identifier that is used by the MTC server in the triggering message, is used in the broadcast too. An alternative implementation to a new specific broadcast channel may also be to use the existing paging procedure possibly with enhancements.

A non-stationary MTC user MTC device that is not registered may either be seen as an exceptional case by the SGSN/MME and return a error code back to the MTC-SC and further to the MTC Server, or it may be seen as a normal case and the SGSN/MME may invoke broadcast/paging in a broader area (possibly stepwise broader and broader until the MTC user MTC device responds).

A stationary MTC user MTC device that is currently registered may be triggered by the normal paging procedure. If it already had a connection established (PDP context) the SGSN/MME may skip the paging and immediately return an acknowledgement to the MTC-SC and further to the MTC server.

When the SGSN or MME has successfully triggered the MTC user MTC device, it sends a positive acknowledgement message back to the MTC-SC, which then forwards the message to the MTC server that initially triggered the MTC device triggering poll of the MTC user MTC device. The SGSN/MME may alternatively wait with sending the acknowledgement until the MTC user MTC device has established its connection, so that the MTC server knows it can immediately start to communicate with the MTC user MTC device.

Figure 2:
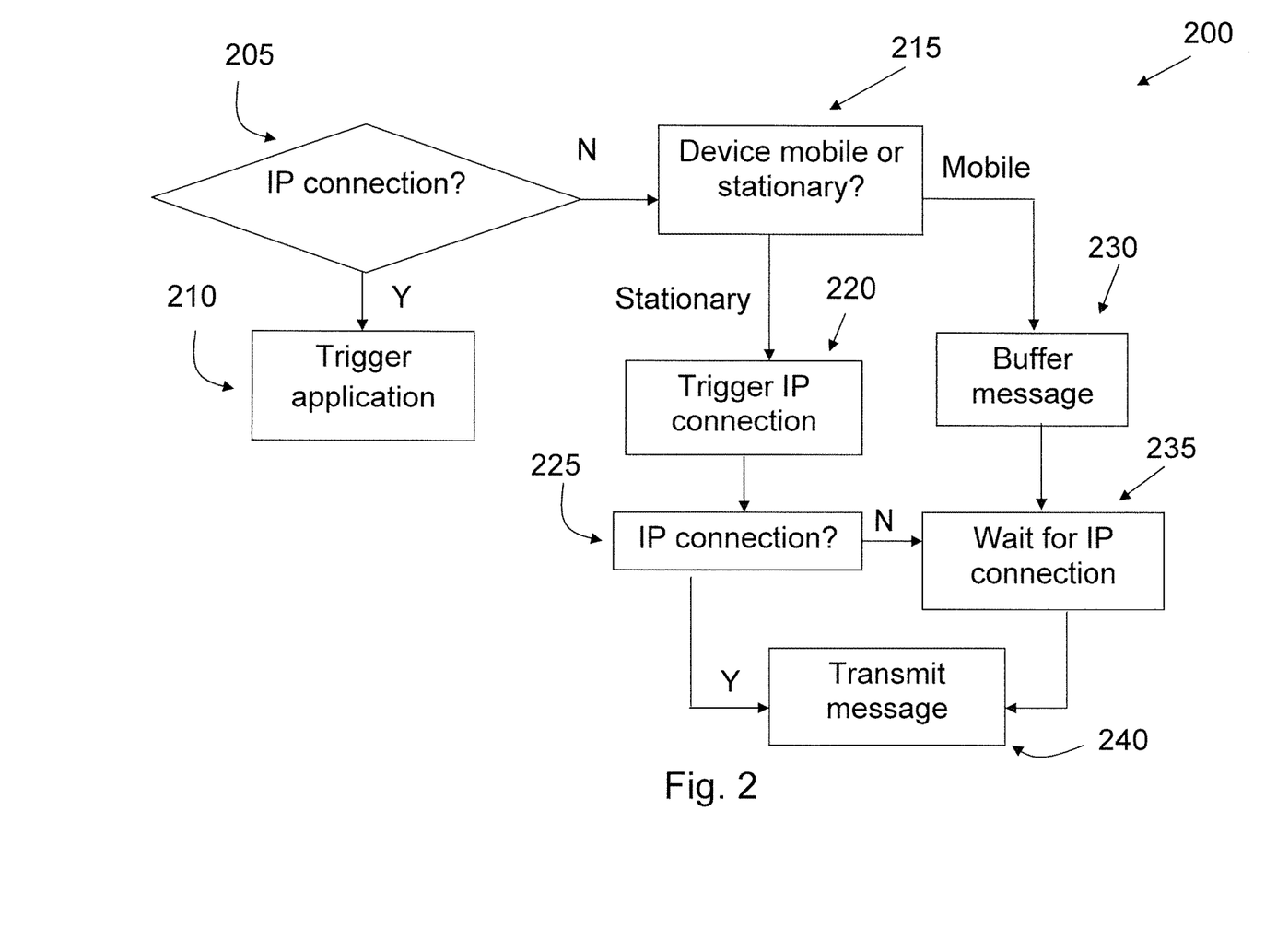
FIG. 2 shows a schematic flow chart for use in a server of the invention.

FIG. 2 shows a schematic flow chart 200 of the function of an MTC server 115 of the invention. As shown in step 205, when the MTC server needs to communicate with an MTC user MTC device, it ascertains if the MTC user MTC device has an IP connection or not, which will tell the MTC server if the MTC user MTC device is in a "dormant" state or not. If the MTC user MTC device has an IP connection, i.e. it is not in a dormant state, the MTC server sends a message to the MTC user MTC device to trigger an application which the MTC server defines in the message. This is shown in step 210. As an alternative to defining the application in the message, it is of course possible to have an MTC user MTC device which is only capable of one application, so that any message to awaken it to acquire an IP connection will automatically trigger it to start the one and only application that the MTC user MTC device is capable of.

As shown in step 215, if the MTC user MTC device does not have an IP connection, i.e. it is in a dormant state, the MTC server checks if the MTC user MTC device is defined as being a stationary or a mobile MTC user MTC device. Examples of stationary MTC user MTC devices include power meters etc in households, and examples of mobile MTC user MTC devices include MTC devices located in vehicles, vessels etc, for remote control or for remote reading or meters.

As shown in step 220, for a stationary MTC user MTC device, the MTC server sends a message to the network 100, preferably to an MTC SC 110, to trigger the MTC user MTC device to initiate an IP connection to the network 100. As shown in step 225, the MTC server then checks if the MTC user MTC device has acquired an IP connection to the network 100. If that is not the case, the MTC server waits, step 235, until the MTC user MTC device has acquired an IP connection. For a user which has an IP connection, or which acquires one after step 235, the MTC server transmits, step 240, a message to the MTC user MTC device to initiate an application which is defined by the MTC server in the message either explicitly or implicitly, as explained above.

After the check in step 215, for the case of a mobile MTC user MTC device, the MTC server does not send a message to make the MTC user MTC device acquire an IP connection, but waits for the MTC user MTC device to acquire an IP connection, step 235, and when that happens, the MTC server transmits, step 240, a message to the MTC user MTC device to initiate an application which is defined by the MTC server in the message either explicitly or implicitly, as explained above.

As shown in step 230, in embodiments, the MTC server is arranged to, for a mobile MTC user MTC device which does not have an IP connection to the cellular access network, create the "application triggering message" and store it until the mobile MTC user MTC device has acquired an IP connection to the network 100.

In steps 205, 225 and 235, the MTC server ascertains if the MTC user MTC device has an IP connection, or waits to find this out. In embodiments, the MTC server is arranged to do this by means of information from a RADIUS server in the cellular access network 100, so that the MTC server is arranged to have an interface the RADIUS server.

In embodiments, the server can ascertain, as it does in step 215, if an MTC user MTC device is defined by the server as being a mobile user MTC device or a stationary user MTC device by means of maintaining a list of the user MTC devices in said plurality, where each user MTC device is classified as one which is either mobile or stationary.

Suitably, the MTC server is arranged to receive a confirmation message in reply to the message to the cellular access network 100 to trigger the user MTC device to initiate an IP connection to the cellular access network.

In embodiments, the server is arranged to address the MTC user MTC device in the messages which are sent to the MTC user MTC device or to the cellular access network by means of an identifier/number/address which is internal to the MTC server and the plurality of MTC user MTC devices which the MTC server controls.

As has emerged, in embodiments, the MTC server is arranged to include in the plurality of user MTC devices which the MTC server controls MTC device which are Machine Type Communication MTC devices, MTC devices.

The invention also discloses a user MTC device (UE, i.e. an MTC UE or MTC User MTC device, below alternatively referred to only as the UE) for a cellular access network, which is arranged to assume a first state in which it is connected to the cellular access network and has an IP address in the cellular access network. The user MTC device is also arranged to assume a second state, in which second state the user MTC device is attached to the network, the user MTC device further being arranged to, when it is in the second state, either at defined points in time listen to a dedicated broadcast channel for MTC devices in the second state, on which dedicated broadcast channel the user MTC device is arranged to receive commands to assume the first state, or to, at defined points in time, assume the first state and transmit one of a number of predefined messages.

A new functional entity, referred to above as an MTC-SC, is in embodiments introduced for the 3GPP GPRS/EPS architecture. The MTC-SC has a function for MTC user MTC device triggering and acknowledgement messages. The MTC-SC may be a standalone node or it may be a new function in an SMS-SC (SMS Service Centre) node. The MTC-SC may operate in the Packet Switched domain only, or it may operate in both the Packet Switched and the Circuit Switched domain. In the latter case, the MTC-SC may do the triggering of the MTC user MTC device through the MSC, Mobile Switching Centre.

A new protocol (or a modified existing protocol used in the SMS-SC) is specified for the reference point between the MTC server and the MTC-SC. Among the messages that can be carried over this reference point are the MTC device triggering request and acknowledgement messages. A secure connection with at least authentication is supported over the reference point.

Enhancing the SMS-SC with a new reference point to the MTC Server. Basically co-locating a M2M-SC with the SMS-SC.

The new reference point between the MTC Server and the MTC-SC (or the SMS-SC) uses a new MTC addressing/numbering/identity scheme that is defined for the MTC devices, which can accommodate and uniquely identify more than 50 billion MTC devices. Alternatively, the invention may use an identity scheme which uses a service provider's or enterprise's MTC device identity coded into a SIP URI. A coding into a more general URI e.g. as a MTC device identity included in a domain name may also be used.

A new or modified existing protocol is specified for the reference point between the MTC-SC server and the HSS to transfer Send Routing Info for MTC device request and result messages.

The HSS stores new subscriber information about the MTC devices such as the new MTC device identity, current location (existing standard) and the new "stationary type" and provides the MTC-SC with IMSI, current location and stationary type information based on using MTC device identity as a key to the HSS data base. As an alternative, this may be stored in the HLR instead.

A new or modified existing protocol is specified for the reference point between the MTC-SC server and the SGSN and MME to transfer MTC device triggering requests and subsequent acknowledgement messages.

The SGSN and MME have new functionality for waking up MTC devices from any of their dormant states. They receive the MTC device triggering request from the MTC-SC and depending on which stationary type it is and thus in what dormant state it is; the SGSN/MME decides which wake-up method to use.

If the MTC device is registered (attached), the BSS or RAN can page the MTC device in either the CS or PS domain depending on where it's registered. If the MTC device is not registered, the BSS or RAN performs a new type of broadcast page that triggers the MTC device to register (attach) to the network.

The MTC devices that are registered listens for paging and when paged they initiate the set up of a PDP/PDN connection in order to get IP connectivity so that communication with the MTC server becomes possible. MTC devices that are not registered listens to a new type of broadcast channel and if they are paged there they will try to register to the network by initiating the attach procedure followed by setting up a PDP/PDN connection in order to get IP connectivity.

The SGSN and MME have a new functionality to return a triggering acknowledgement to the MTC server via the MTC-SC. The acknowledgement message is sent immediately after the paging/broadcasting has started, or alternatively it is sent only after the MTC device has set up its PDP/PDN connection as a response to the page/broadcast.

In addition to the server and the user MTC device described above, the invention also discloses, for delay tolerant applications, a user MTC device with a "store and forward mechanism", as well as a "store and forward mechanism" as such. This will be described below.

For the delay tolerant type of application, the basic idea presented here consists of the following parts: (a) communication between the MTC device and the fixed application is based on a store-and-forward functionality; (b) the communication is initiated from the MTC device through a mechanism where the MTC device tries to access the NW (Network) at (regular) intervals. The MTC device will "poll" the NW for any messages to it, (c) there exists a mechanism in the NW for allowing the MTC device to access the NW and minimizing the signaling. This mechanism is based on open/closed gating for the MTC device.

A store and forward service can be used for communicating between the MTC device and the fixed application. The store and forward service can be bidirectional. In particular the fixed application may use the store and forward service to send a message to the MTC device or to request information from the MTC device, in the latter case by letting the fixed application "posting" a request to the MTC device in the store and forward server.

The MTC application is delay tolerant, and there exist a pre-configured longest acceptable delay for messages sent from and to the MTC device. The pre-configured delay will be the basis for configuring the store and forward mechanism used in combination with the MTC device timer for accessing the NW.

The particular solution proposed here uses polling from the MTC device. The mechanism is as follows: (a) the MTC device is normally in a low energy consumption state (what this state is and how the MTC device ends up in this state is discussed below), (b) the MTC device wakes up at regular (or random or with a random component (i.e. de-correlated from other MTC devices) time intervals and polls the network in order to become reachable from the NW or to send data to the NW (what this polling consists of is discussed below), (c) the NW has some context for the MTC device; this "MTC device context" may reside in different nodes depending on the state and type of MTC device (see below). This "MTC device context" contains a "Gate function": (i) the Gate function may be closed, meaning that the NW will deny access to the NW when the MTC User MTC device sends in its poll; (ii) the Gate function may be opened, meaning that when the gate is open, the NW will allow the MTC device to communicate via the NW; (d) The NW Gate function should be normally closed. Only when the application on the fixed side needs to reach the MTC device, the gate is opened. The gate may be opened e.g.: (i) by the application signaling to the MTC Server that the MTC device needs to be reached, (ii) by the application setting a parameter in the MTC Server for one or more intervals to open the gate, (iii) there exists some message to the MTC device in the store-and-forward server, (iv) the operator needs to reach the MTC device for MTC device management; (e) the Gate function may reside in the MME and the MTC Server may have a signaling channel towards the MME. The MTC Server may also have an Rx-type of interface towards the application. In addition the Gate function may have functionality or data in the HSS/HLR.

Description of the MTC User MTC Device Sleep State

The MTC User MTC device sleep state could be any energy saving state, such as: (a) A "power-off"-state. In this case the MTC User MTC device needs anyway a timer and a wake up mechanism. The MTC User MTC device will then try to attach to the NW at wake up; (b) Attached state, with monitoring paging channel+polling functionality. The MTC User MTC device may then wake up, send a service request to the NW in order to establish PDN Connection or dedicated bearers in order to connect to the MTC application; (c) Any state+monitoring some external stimulus such as e.g. earth quake detector or other alarm function.

The NW "MTC Device Context"

The MTC device context may reside in different nodes depending on the state and type of MTC device. Optimally, the context shall be as close to the MTC device as possible in order to minimize signaling in the NW. When the MTC device wakes up and is not attached, it first tries to attach to the NW in order to start communication with the NW (or to get a message from the store and forward server). In the case there is a message for the MTC device, there should be a context for the MTC device in the MME, indicating that the gate is open for this MTC device and that it will be allowed to attach. When there is no message for the MTC device, there is no context for this MTC device in the MME and the gate is closed.

First alternative is to keep the "MTC device context" it in the MME or SGSN, which is known by the HSS/HLR as the "current/last known" SGSN/MME location. At least three variants for maintaining the "MTC device context" holding the gating state in the SGSN/MME can be envisioned: (a) Within the normal MM (machine to machine) context, (b) Separate from the MM context, (c) Hybrid, i.e. within the MM context when it is present, but separate when the MM context is dropped in the SGSN/MME.

When the "MTC device context" resides in the SGSN/MME, it may be part of the normal MM context, or it may be maintained separately from the MM context. If it is part of the MM context, it is kept in the SGSN/MME as long as the MTC device is attached. To speed up handling and reduce HSS/HLR signaling when the MTC device reattaches the SGSN/MME does normally also keep the MM context when the MTC device detaches (in the "VLR"), at least as long as it has sufficient memory available. Such an MM context kept for a detached MTC device will also be sent to any new SGSN/MME as part of MM procedures if the mobile MTC device happens to attach again in an area covered by another SGSN/MME. An SGSN/MME can however drop an MM context for a detached MTC device at any time if it runs out of memory. If that happens with an MM context having a "MTC device context" within it, the gating state would be lost and the normal signaling including PDN/PDP connection setup and a poll would occur the next time the MTC device tries to attach to the network.

If the "MTC device context" is maintained separately from the MM context in the SGSN/MME it may be kept even when the MTC device is in a detached state, and even when the MM context is dropped due to memory constrains. With this alternative, the "MTC device context" will however be lost if the MTC device is mobile and moves outside the SGSN/MME coverage area before it attaches next time.

In the "hybrid" alternative the "MTC device context" is maintained in the MM context when available. This ensures that the gating state will be forwarded to any other node if the MTC device is mobile and moves to the coverage area of another SGSN/MME. If the MM context is dropped by the SGSN/MME due to memory constraints when the MTC device is in a detached state, the SGSN/MME continues to maintain the a smaller "MTC device context" with the gating state. This will ensure that the gating state is always present when a MTC device attaches again within the coverage area of the SGSN/MME.

In an advanced hybrid implementation, the "MTC device context" is also sent to any new MME/SGSN, even if no MM context were present. This would solved by adding the "MTC device context"/gating info as a new conditional parameter in the "Identification Response" message, the "Context Response" message and the "SGSN Context Response" message.

When an SGSN/MME which maintains separate "MTC device contexts" receives a Cancel Location message from the HSS/HLR, it should drop the "MTC device context" that has been canceled. Otherwise conflicting gating states may be stored in different MMEs/SGSNs.

The "MTC device context" when maintained separately in the SGSN/MME, may be based on the IMSI. Depending on SGSN/MME implementation how temporary identifiers are reused, it may also in addition be based on the temporary identifier used by the MTC User MTC device (e.g. S-TMSI/GUTI or P-TMSI) to avoid signaling retrieving the IMSI from HSS/HLR or old SGSN/MME.

For stationary MTC devices, the "MTC device context" may optionally be stored in the BSS/RAN node. That is, in the BSC, RNC or eNodeB. Since stationary MTC devices don't change cell it is possible to know in which cell the MTC device will start to send its polling request. Hence if there is no message waiting in the MTC server, the MTC device poll would only require a minimum of resources if the gating is done in the BSS/RAN node.

Other alternative to keep the "MTC device context" may be in HSS/HLR or MTC Server instead of in the MME or SGSN. This will result in more signaling at the MTC device poll, but still some signaling may be saved since there would be no need to set up PDN connections or PDP Contexts.

The MTC Device Polls the Network

There may be an indication in the attach request from the MTC device, indicating if the MTC device is only polling the NW or if the MTC device actually has some data to send by itself, in which case the MTC device may optionally be allowed to register (no signaling would in such case be saved by denying the MTC device access).

There shall also be an indicator in the attach request from the MTC device indicating that the MTC device is subject to the "open/closed gate"—function, such that the MTC device can be denied to attach safely (other MTC devices not subject to this function shall of course always be allowed to attach as usual). Alternatively this indicator may be stored in the HSS/HLR.

Figure 3:
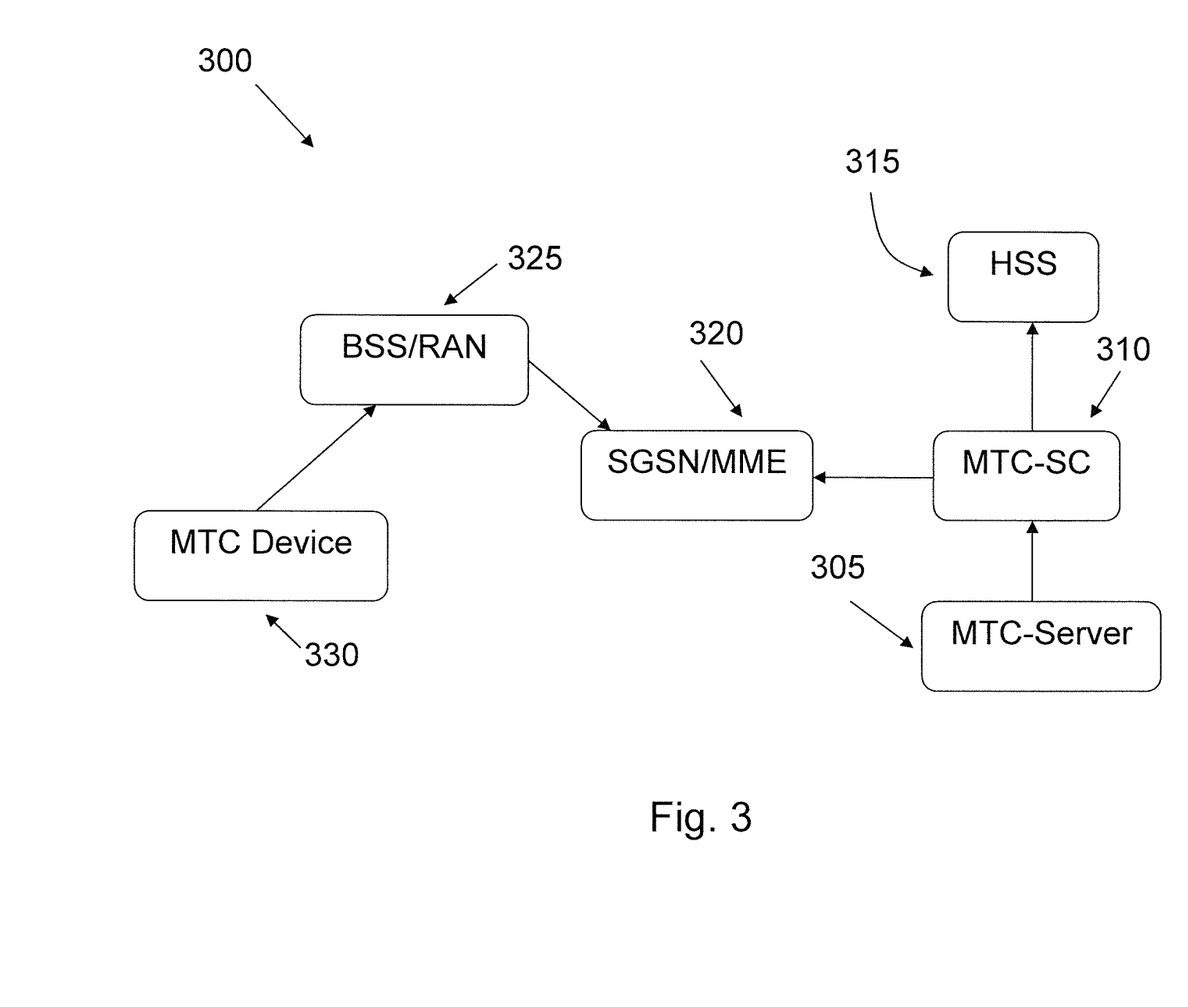
FIG. 3 shows a schematic view of a system in which a second embodiment of the invention is applied.
Figure 4:
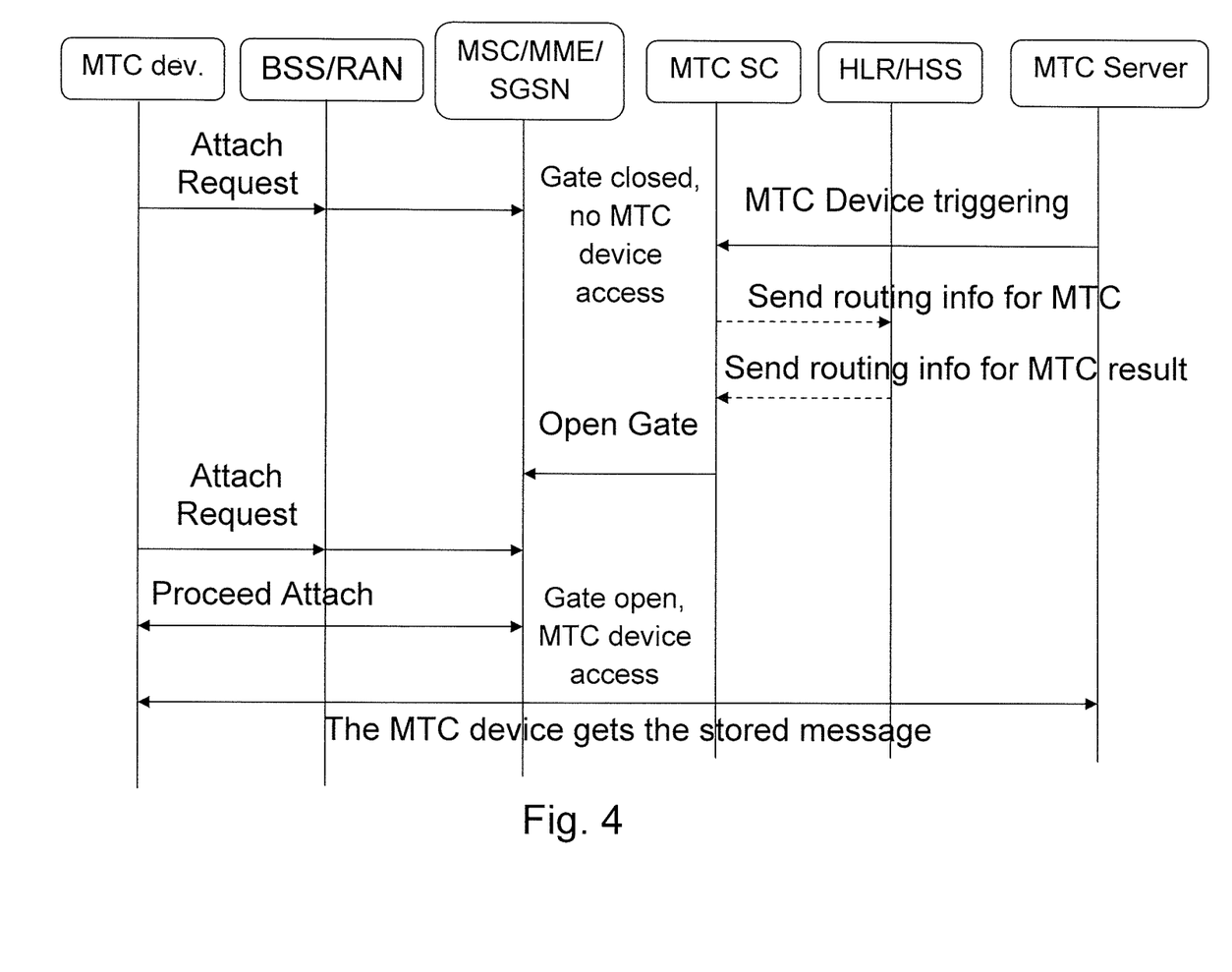
FIG. 4 shows a signaling diagram for the second embodiment of the invention.

The proposed MTC signaling architecture with an added MTC-SC for signaling purposes between the operator and service provider domains is shown in FIG. 3.

FIG. 3: Architecture for the Gating Function.

The MTC Server 305 contains a store and forward server. When a message to the MTC device 330 is posted, the MTC Server indicates to the MTC-SC 310 that the MTC device has a message. This can e.g. be by using the MTC device Trigger message.

When the MTC-SC has received the MTC device trigger (i.e. "communication request") from the MTC Server, the MTC-SC has an interface to the HSS/HLR by which is can retrieve information about the particular MTC device: (a) it is a polling MTC device, (b) it is stationary or moving, (c) last know cell id (optional and only for stationary MTC devices), (d) the IMSI of the MTC device—if an alternative MTC identifier is used in the protocol from the MTC Server to the MTC-SC, such as a Service Provider Subscriber Identifier, a SIP URI, or other URI or domain name identifying a single MTC device, the MTC-SC uses the HSS/HLR to translate that identifier to the IMSI of the MTC device, (e) the current location i.e. the SGSN/MME 320 where the MTC device is or was last attached, (f) attach status.

If the MTC-SC sees in the HSS 315 information that a MTC device is a "polling MTC device" it knows it shall send an "open gate" message to the MME/SGSN, and not try to page the MTC device as would be the normal procedure. When the MTC device is stationary a message is sent to the particular MME where this MTC device may access, indicating the MME to open the gate for this MTC User MTC device and allow it to access/attach the next time it tries to acc2ess the NW. Optionally the M2M-SC requests the MTC User MTC device location from the HSS.

If the MTC-SC sees in the HSS information that a MTC device is a "stationary MTC device" the gating can optionally be done in the BSS/RAN node (i.e. BSC, RNC or eNodeB). The Last known Cell id would in that case also be required for the MME/SGSN to find the right BSS/RAN node to forward the "open gate" message to. Doing gating in the BSS/RAN node saves additional signaling in the network, since the radio connection (e.g. RRC connection) does not need to be established. The request can immediately be rejected e.g. with a "no messages" cause code.

In case the MTC device would be already attached (see figure below), the polling mechanism would be that the MTC device sends "Service Req" instead of "Attach Req". In that case the "Service Req" can be immediately rejected in case the gate isn't open, i.e. no message waiting.

FIG. 2: Signaling Procedure for the Gating Function

The "message" for which a gate is opened for a polling MTC device can be seen in a more general way. It can for example be to: (a) Actually allow the MTC device to retrieve a message that has been buffered in the MTC Server. The retrieval made using any IP based protocol over the user plane (PDP/PDN connection); (b) Or, the retrieved message being an explicit textual or coded representation of a "command" to the polling MTC device to do something e.g. do a meter reading and send to the MTC server or switch on the heating for an MTC device connected to a summer cabins heating system etc; (c) Or, the opened gate just being an implicit indication to the polling MTC device to start any application specific protocol between the MTC device and the MTC server (or direct to the MTC User/application server via the MTC server). That is, no "message" buffered in the MTC Server at all.

Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A server apparatus for communicating with user machine type communication (MTC) devices, the server apparatus being arranged to:
   determine whether a user MTC device does not have an IP connection with a cellular access network (CAN);
   determine whether the user MTC device is a stationary user MTC device; and trigger the user MTC device to initiate an IP connection with the CAN, wherein the server apparatus is configured such that the server apparatus triggers the user MTC device to initiate the IP connection with the CAN if and only if the server apparatus determines (a) that the user MTC devices is a stationary device and (b) that the user MTC device does not have the IP connection, wherein the server apparatus is further configured such that, after triggering the user MTC device to initiate the IP connection with the CAN, the server apparatus monitors the user MTC device to detect whether the user MTC device has acquired the IP connection, the server apparatus is further configured such that, after the server apparatus detects that the user MTC has acquired the IP connection, the server apparatus causes the user MTC device to initiate an application, the server apparatus is configured to cause the user MTC device to initiate the application by transmitting to the user MTC device an application triggering message, and the server apparatus is further configured such that, after triggering the user MTC device to initiate the IP connection with the CAN, the server apparatus waits until it has received confirmation that the user MTC has established the IP connection before the server apparatus transmits the application triggering message.

2. The server apparatus of claim 1, wherein the server apparatus is further configured such that, after triggering the user MTC device to initiate the IP connection with the CAN and before transmitting the application triggering message, the server apparatus obtains information from a server and uses the obtained information to determine whether the IP connection has been established.

3. The server apparatus of claim 1, wherein the server apparatus is configured to trigger the user MTC device to initiate the IP connection with the CAN by transmitting a device triggering message to a network node.

4. The server apparatus of claim 1, wherein the server apparatus is configured such that the server apparatus uses information obtained from a RADIUS server to determine that the user MTC device does not have an IP connection with the CAN.

5. The server apparatus of claim 1, wherein the server apparatus is configured such that the server apparatus uses a pre-defined list of stationary user MTCs to determine that said user MTC is a stationary user MTC.

6. A method performed by a server apparatus for communicating with user machine type communication (MTC) devices, the method comprising:

determining, by the server apparatus, that a user MTC device does not have an IP connection with a cellular access network (CAN)

determining, by the server apparatus, that the user MTC device is a stationary user MTC device; and the server apparatus triggering the user MTC device to initiate an IP connection with the CAN, wherein the server apparatus is configured such that the server apparatus performs the triggering step if and only if the server apparatus determines (a) that the user MTC device does not have an IP connection with the CAN and (b) that the user MTC device is a stationary device, after triggering the user MTC device to initiate the IP connection with the CAN, the server apparatus causes the user MTC device to initiate an application, the step of causing the user MTC device to initiate the application comprises the server apparatus transmitting to the user MTC device an application triggering message, and after triggering the user MTC device to initiate the IP connection with the CAN, the server apparatus waits until it has received confirmation that the user MTC has established the IP connection before the server apparatus transmits the application triggering message.

7. The method of claim 6, wherein, after triggering the user MTC device to initiate the IP connection with the CAN and before transmitting the application triggering message, the server apparatus obtains information from a server and uses the obtained information to determine whether the IP connection has been established.

8. The method of claim 6, wherein the step of triggering the user MTC device to initiate the IP connection with the CAN comprises transmitting a device triggering message to a network node.

9. The method of claim 6, wherein determining that the user MTC device does not have an IP connection with the CAN comprises the server apparatus obtaining information from a RADIUS server and using the information to determine that the user MTC device does not have an IP connection with the CAN.

10. The method of claim 6, further comprising storing a pre-defined list of stationary user MTCs, wherein the step of determining that said user MTC is a stationary user MTC comprises obtaining information from said list and using said obtained information to determine that the user MTC device is a stationary user MTC device.

11. A server for use in or in connection with a cellular access network, the server being arranged to:

control a plurality of user MTC devices in or in connection to the cellular access network, ascertain if a user MTC device in said plurality has any IP connection to the cellular access network, send an application trigger message to the user MTC device to trigger the user MTC device to initiate an application defined in the application trigger message in the case that the user MTC device has an IP connection to the cellular access network, and ascertain if the user MTC device is defined by the server as being a mobile user MTC device or a stationary user MTC device in the case that the user MTC device not have any IP connection to the cellular access network, wherein for a stationary user MTC device that does not have any IP connection to the cellular access network, the server is further arranged to send an IP connection trigger message to the cellular access network to trigger the user MTC device to initiate an IP connection to the cellular access network, for a mobile user MTC device that does not have any IP connection to the cellular access network, the server is further arranged to refrain from sending an IP connection trigger message for triggering the user MTC device to initiate an IP connection and wait until the user MTC device has acquired an IP connection to the cellular access network, and for both stationary and mobile user MTC devices, the server is further arranged to, when the user MTC device has acquired an IP connection to the cellular access network, to transmit a second application trigger message to the user MTC device to initiate an application defined by the server in the second application trigger message.

12. The server of claim 11, being arranged to, for a mobile user MTC device which does not have any IP connection to the cellular access network, create said second application trigger message and store it until the mobile user MTC device has acquired an IP connection to the cellular access network.

13. The server of claim 11, being arranged to ascertain if the user MTC device has an IP connection to the cellular access network by means of information from a RADIUS server in the cellular access network, to which the RADIUS server the server is arranged to have an interface.

14. The server of claim 11, being arranged to ascertain if the user MTC device is defined by the server as being a mobile user MTC device or a stationary user MTC device by means of maintaining a list of the user MTC devices in said plurality, where each user MTC device is classified as one which is either mobile or stationary.

15. The server of claim 14, being arranged to receive a confirmation message in reply to the IP connection trigger message to the cellular access network to trigger the user MTC device to initiate an IP connection to the cellular access network.

16. The server of claim 11, being arranged to address the user MTC device in the messages which are sent to the user MTC device or to the cellular access network by means of an identifier which is internal to the server and the plurality of user MTC devices.

17. The server of claim 11, being arranged to include in said plurality of user MTC devices Machine Type Communication MTC devices.

18. A server apparatus for communicating with user machine type communication (MTC) devices, the server apparatus being arranged to:
   determine whether a user MTC device (a) does not have an IP connection with a cellular access network (CAN) and (b) is a stationary user MTC device or a mobile MTC device;
   in response to determining that the user MTC devices is a stationary device and the user MTC device does not have the IP connection, trigger the user MTC device to initiate an IP connection with the CAN; and
   in response to detecting that the user MTC devices is a mobile device and the user MTC device does not have the IP connection, refrain from triggering the user MTC device to initiate an IP connection and wait until the user MTC device has acquired an IP connection with the CAN and cause the user MTC device to initiate an application after the user MTC device has acquired the IP connection with the CAN.

\* \* \* \* \*